(12) United States Patent
Fang

(10) Patent No.: US 11,713,780 B2
(45) Date of Patent: *Aug. 1, 2023

(54) LUG NUT

(71) Applicant: Chongqing Delongsheng Industrial Co., Ltd., Chongqing (CN)

(72) Inventor: Dewang Fang, Chonqging (CN)

(73) Assignee: Chongqing Delongsheng Industrial Co., Ltd., Chongqing (CN)

( * ) Notice: Subject to any disclaimer, the term of this patent is extended or adjusted under 35 U.S.C. 154(b) by 65 days.

This patent is subject to a terminal disclaimer.

(21) Appl. No.: 17/403,926

(22) Filed: Aug. 17, 2021

(65) Prior Publication Data
US 2021/0372459 A1  Dec. 2, 2021

Related U.S. Application Data

(63) Continuation of application No. 16/412,910, filed on May 15, 2019, now Pat. No. 11,092,187.

(30) Foreign Application Priority Data

Dec. 26, 2018  (CN) .......................... 201822200961.3

(51) Int. Cl.
  *F16B 37/14*  (2006.01)
  *F16B 37/00*  (2006.01)

(52) U.S. Cl.
  CPC .............. *F16B 37/14* (2013.01); *F16B 37/00* (2013.01)

(58) Field of Classification Search
  CPC .. F16B 23/22; F16B 23/0007; F16B 23/0061; F16B 23/0069; F16B 23/0076; F16B 31/02; F16B 37/00; F16B 37/14; F16B 41/005

USPC ......................................... 411/427, 429–432
  See application file for complete search history.

(56) References Cited

U.S. PATENT DOCUMENTS

| | | | | |
|---|---|---|---|---|
| 3,003,379 A | * | 10/1961 | Pribitzer | B25B 13/02 81/119 |
| 4,015,503 A | * | 4/1977 | Romano | F16B 37/14 411/429 |
| 4,123,961 A | * | 11/1978 | Chaivre | F16B 37/14 470/22 |
| 4,764,070 A | * | 8/1988 | Baltzell | F16B 37/14 411/375 |
| 4,775,272 A | * | 10/1988 | Toth | B23K 11/14 411/429 |
| 5,302,069 A | * | 4/1994 | Toth | F16B 37/14 411/429 |

(Continued)

*Primary Examiner* — Roberta S Delisle
(74) *Attorney, Agent, or Firm* — Edwin A. Sisson, Attorney at Law, LLC; Jeffrey J. Banyas

(57) ABSTRACT

The utility model discloses a wheel nut, including a nut body which the outside surface comprises of multiple identical arc surfaces. The arc surface is protruding outward, and the radius of the arc surface is larger than the circumscribed radius of the outside surface of the nut body. The utility model designs the existing square surface of the outer hexagon feature of the wheel nut as an arc surface, which the contact area between the wheel nut and the sleeve and the loading area of the wheel nut can be increased, and then the deformation and looseness of the wheel nut can be avoided effectively, and therefore the service life of the wheel nut can be improved.

5 Claims, 4 Drawing Sheets

(56) References Cited

U.S. PATENT DOCUMENTS

| | | | | |
|---|---|---|---|---|
| 5,380,070 A * | 1/1995 | FitzGerald | ................ | B60B 7/00 |
| | | | | 411/374 |
| 6,036,420 A * | 3/2000 | Somers | ................... | F16B 37/14 |
| | | | | 411/429 |
| 6,827,539 B2 * | 12/2004 | Somers | ................... | F16B 37/14 |
| | | | | 411/429 |
| 6,866,457 B2 * | 3/2005 | Wilson | ................... | F16B 37/14 |
| | | | | 411/431 |
| 6,935,825 B2 * | 8/2005 | Winker | ................... | F16B 37/14 |
| | | | | 411/533 |
| 2013/0216330 A1 * | 8/2013 | Milligan | ................ | F16B 37/14 |
| | | | | 411/429 |

* cited by examiner

LUG NUT

PRIORITIES AND CROSS REFERENCES

This Application claims priority from U.S. application Ser. No. 16/412,910 filed on 15 May 2019 and Chinese Application No. 201822200961.3 filed on 26 Dec. 2019, the teachings of each of which are incorporated by reference herein in their entirety.

TECHNOLOGY FIELD

The utility model refers to a fastener for automobile, in particular to a wheel nut.

TECHNICAL BACKGROUND

The wheel is an important part of the automobile driving system, which the main role is to support the whole car, to buffer the impact from the road to maintain the balance of the vehicle, and to develop driving force and braking force by the adhesion between the tire and the road. In the process of automobile driving, the wheels may need to be replaced for various reasons. The wheel nuts connecting the rim and the hub need to be removed for each change, and the reciprocating disassembly, installation and tightening again will result in the deformation and looseness of the steel wheel nut cap, and even the problems such as nut adhesive to the sleeve, so that the wheel nut may fall off and potential security risks may occur.

Therefore, technicians in this field are committed to developing a wheel nut that is not easy to deformation.

CONTENT OF UTILITY MODEL

In view of the above defects of the existing technology, the technical problem to be solved by the utility model is to provide a wheel nut, which can solve the deformation and looseness of the existing wheel nut after being used repeatedly.

To achieve the above purpose, the utility model provides a wheel nut, including a nut body which the outside surface comprises of multiple arc surfaces. The arc surface is protruding outward, and the radius of the arc surface is larger than the circumscribed radius of the outside surface of the nut body.

Better, six arc surfaces in all with identical structure, the shape of the cross section of the said nut body is hexagon, and the highest point of the arc on the arc surface is the midpoint of each side of the nut body.

Better, the radius of the arc surface is 20-30 mm larger than the circumscribed radius of the outside surface of the nut body.

Better, six arc surfaces are connected with chamfer.

Better, a nut cap is set above the nut body.

The utility model designs the existing flat surface of the wheel nut as an arc surface, which the contact area between the wheel nut and the sleeve and the loading area of the wheel nut can be increased, and then the deformation and looseness of the wheel nut can be avoided effectively, and therefore the service life of the wheel nut can be improved.

In the figure: 1—Nut body; 2—Arc surface; 3—Nut cap; 5—Sleeve; 6—Nut body in the existing design; R1—the radius of a theoretical circle drawn from an arc surface of the multiple arc surfaces; R2—the circumscribed radius of the outside surface of the nut body; A—the highest point of the arc on the arc surface.

SPECIFIC IMPLEMENTING METHOD

The following is a further explanation of the utility model combined with the attached figures and the implementation. It should be noted that in the description of the utility model, the directions or position relations indicated by the terms "up", "down", "left", "right", "inside" and "outside" are based on the directions or position relations shown in the attached figures, which is only for the convenience of describing the utility model and simplifying the description, rather than indicating or implying that the device or element referred to must have a specific orientation and be constructed and operated in a specific way. Therefore it cannot be understood as a limitation to the utility model. The terms "first," "second," and "third" are used only for descriptive purposes and cannot be understood to indicate or imply relative importance.

Figure 1:
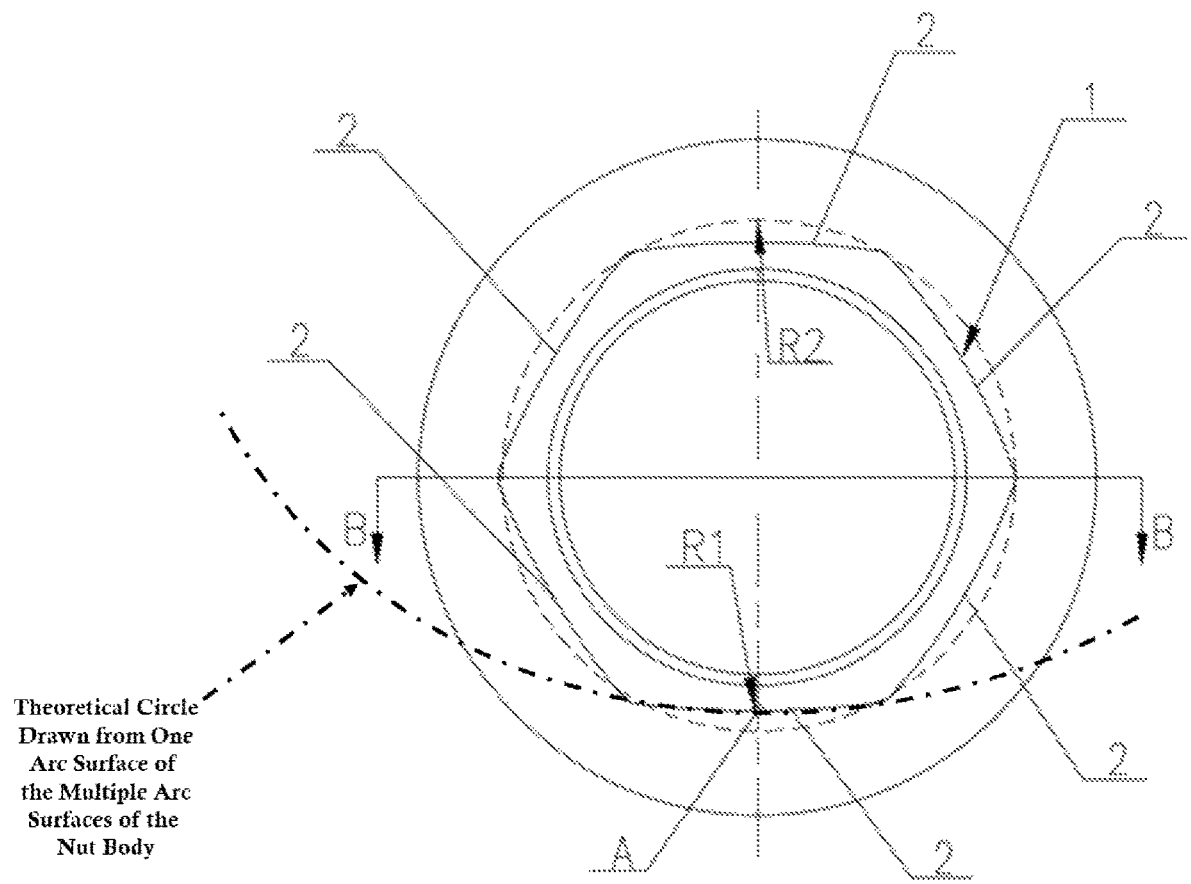
FIG. 1 is the structural diagram of the specific implementing method of the utility model.
Figure 2:
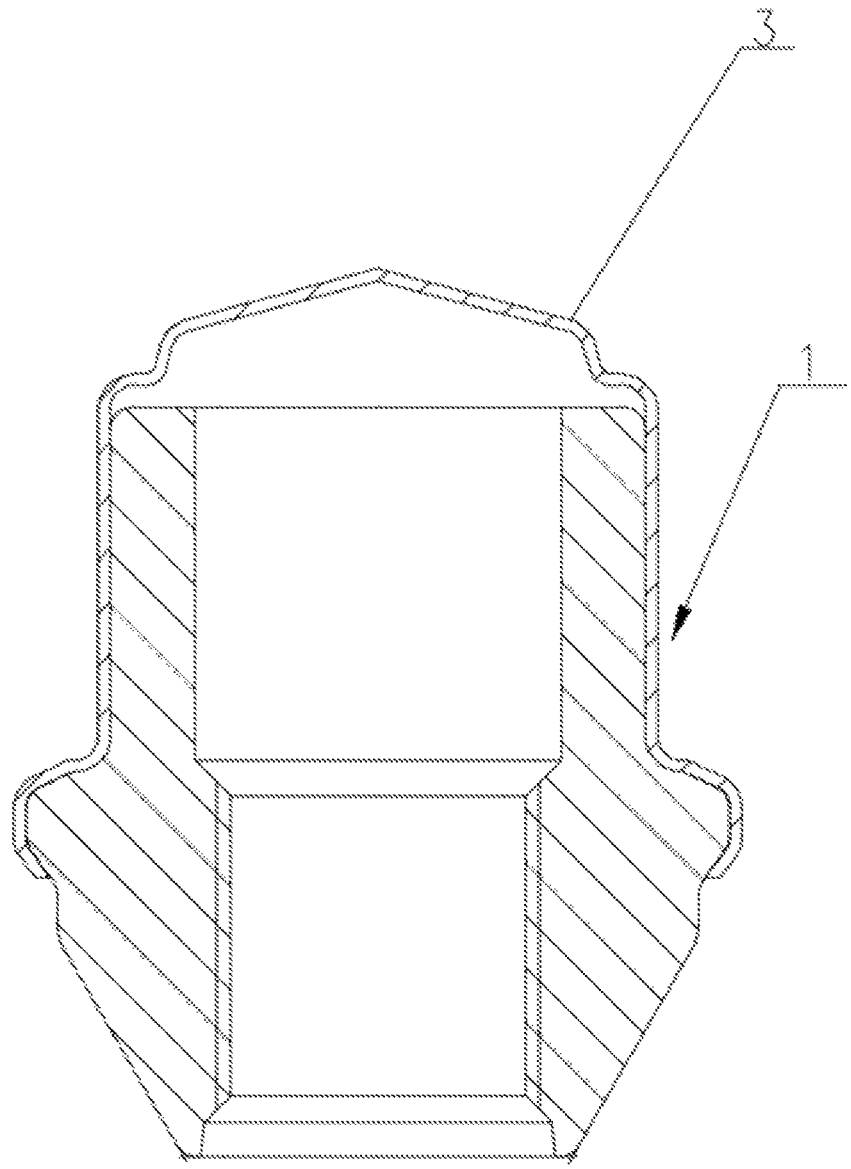
FIG. 2 is the B-B direction sectional structure diagram of FIG. 1.

As shown in FIG. 1 to FIG. 2, a wheel nut, including Nut body 1 which the outside surface comprises of multiple identical Arc surfaces 2. Arc surface 2 is protruding outward, and the radius R1 of a theoretical circle drawn from an Arc surface 2 of the multiple arc surfaces is larger than the circumscribed radius R2 of the outside surface of Nut body 1. It's better that the radius R1 of the theoretical circle drawn from the Arc surface 2 of the multiple arc surfaces is 20 mm, 21 mm, 22 mm, 23 mm, 24 mm, 25 mm, 26 mm, 27 mm, 28 mm, 29 mm, 30 mm larger than the circumscribed radius R2 of the outside surface of the nut body 1. The shape of the cross section of Nut body 1 is hexagon, and the highest point A of the arc on Arc surface 2 is the midpoint of each side of Nut body 1.

By designing the outside surface of the nut body in a circular arc shape, when the nut is removed with Sleeve 5, the contact area between the sleeve and the six surfaces of the nut body and the loading area and loading tolerance of the nut is increased, thus the deformation of the nut or the untightening of the nut due to the small loading area of the nut can be avoided effectively. In addition, the connecting part of six arc surfaces of Nut body 1 can be designed as chamfer, by which the contact area between the nut body and the sleeve cab be further increased, and the risk of deformation of the nut body reduced and the service life of the nut body improved.

A nut cap 3 is set above Nut body 1, and Nut body 1 and Nut cap 3 is connected by flange riveting. On the one hand, the appearance of the nut is beautified; on the other hand, the dirt and other substances are prevented from entering the clearance between the wheel bolt and the wheel nut, so that the clearance between the wheel bolt and the wheel nut is remained clean and the service life of the nut is improved further.

Figure 3:
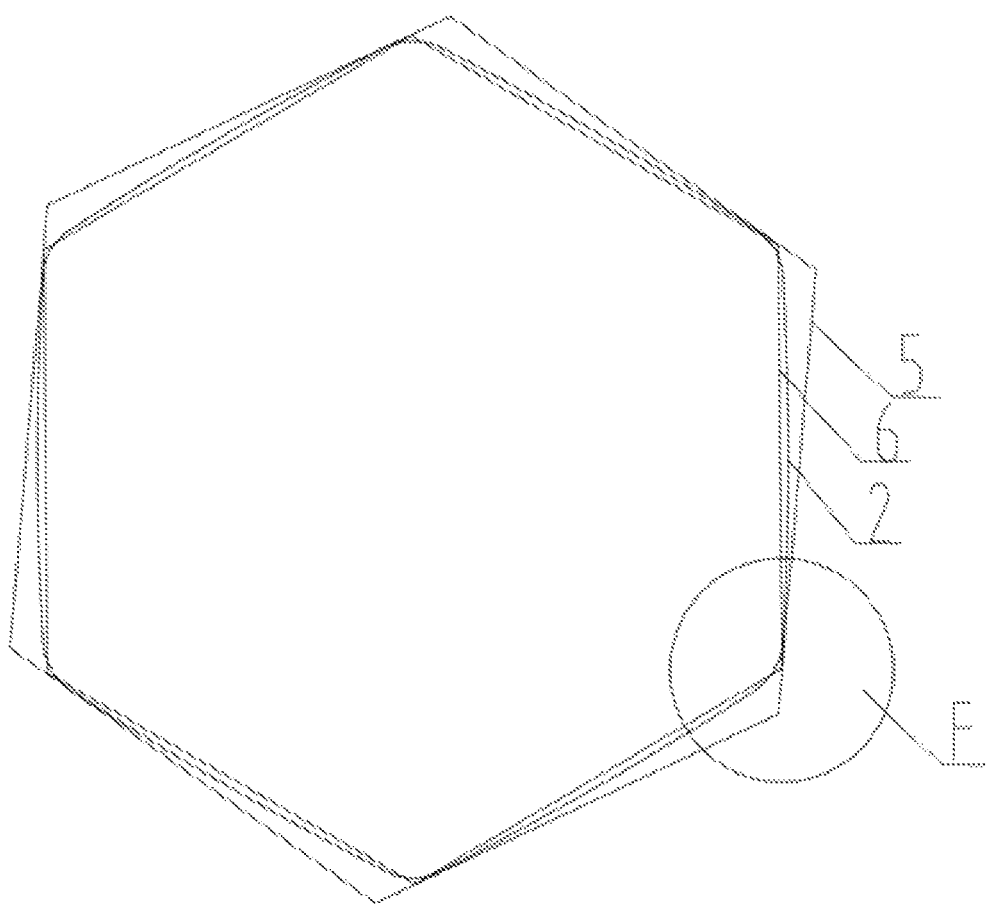
FIG. 3 is the reference diagram of the utility model in the service state.
Figure 4:
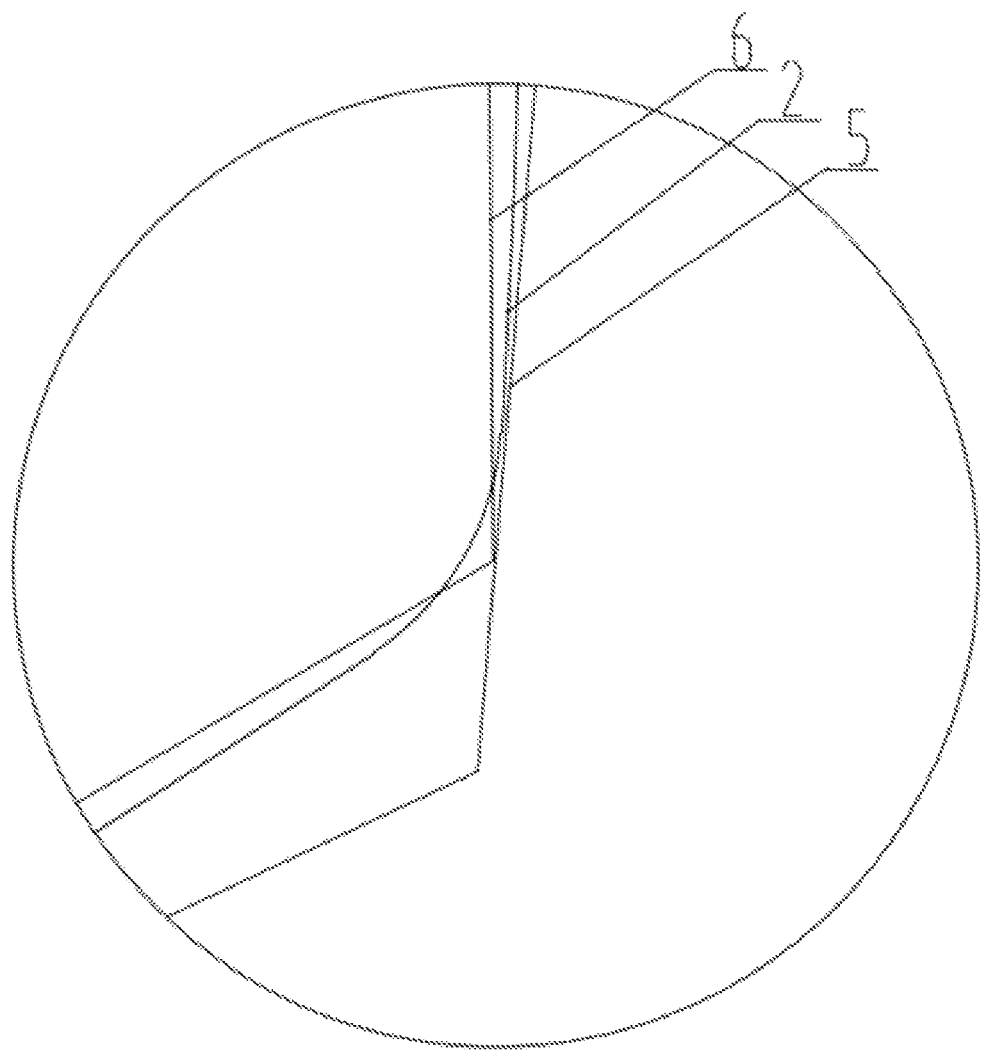
FIG. 4 is the enlarged structural diagram of section F in FIG. 3.

As shown in FIGS. 3 to 4, Sleeve 5 is set on the outside of Nut body 1 when applied, and then Sleeve 5 is rotated, and the contact part between Arc surface 2 of Nut body 1 and Sleeve 5 shall be a surface. If Nut body 6 in the existing design is applied, the contact part between Sleeve 5 and Nut body 1 shall be a line. Therefore, the contact area between Nut body 1 and Sleeve 5 is greatly improved by the utility model, so that the loading capacity of the nut body and the service life of the nut body is improved.

The better concrete implement of the utility model is described in detail above. It should be understood that ordinary technicians in this field can make many modifications and changes according to the conception of the utility model without creative work. Therefore, any technical scheme that can be obtained by the technical personnel in the technical field according to the conception of the utility model on the basis of the existing technology with logical analysis, reasoning or limited experiments shall be within the protection scope determined by the claim.

The invention claimed is:

1. A wheel nut, including a nut body (1) having an outside surface that includes multiple arc surfaces (2); wherein each said arc surface is protruding outward, and the radius (R1) of a theoretical circle drawn from each arc surface of the multiple arc surfaces is at least 60 mm but not more than 100 mm larger than the circumscribed radius (R2) of the outside of the nut body (1).

2. The wheel nut of claim 1, wherein: there are six said arc surfaces (2) in all and with identical structure; the shape of the cross section of the said nut body (1) is hexagon; and wherein the highest point (A) of the arc on each said arc surface (2) is the midpoint of each side of the said nut body (1).

3. The wheel nut of claim 2, wherein the six said arc surfaces (2) are connected with chamfer.

4. The wheel nut of claim 1, wherein a nut cap (3) is set above the said nut body (1).

5. The wheel nut of claim 4, wherein the said nut body (1) and the nut cap (3) are connected by flange riveting.

\* \* \* \* \*